United States Patent [19]
Tannahill et al.

[11] 3,878,045
[45] Apr. 15, 1975

[54] PROCESS FOR THE PRODUCTION OF HETEROPOLYSACCHARIDE BY FERMENTATION OF METHANOL

[75] Inventors: Alex L. Tannahill; Robert K. Finn, both of Ithaca, N.Y.

[73] Assignee: Cornell Research Foundation, Inc., Ithaca, N.Y.

[22] Filed: June 12, 1973

[21] Appl. No.: 369,403

[52] U.S. Cl. .................................. 195/49; 195/31 P
[51] Int. Cl. ............................................ C12d 1/00
[58] Field of Search ............ 195/28 R, 49, 31 P, 96; 260/209 R

[56] References Cited
UNITED STATES PATENTS
3,663,370   5/1972   Kono et al. ........................... 195/49

Primary Examiner—Lionel M. Shapiro
Assistant Examiner—R. B. Penland
Attorney, Agent, or Firm—Lawrence E. Laubscher

[57] ABSTRACT

Disclosed is an improved process for the preparation of a new heteropolysaccharide by a fermentation process comprising culturing a heteropolysaccharide-producing strain of a microorganism of the genus Methylomonas on an aqueous culture medium containing methanol as the sole source of assimilable carbon. The concentration of the product polysaccharide in the fermentation broth is increased, the fermentation time is shortened, and the properties of the polysaccharide are improved by the controlled addition of methanol to the fermentation process near the end of the logarithmic phase of growth of the bacteria.

12 Claims, 2 Drawing Figures

PROCESS FOR THE PRODUCTION OF HETEROPOLYSACCHARIDE BY FERMENTATION OF METHANOL

CROSS REFERENCE TO RELATED APPLICATION

Robert K. Finn et al. application Ser. No. 364,559 filed May 29, 1973, and entitled "Production of Heteropolysaccharide by Fermentation of Methanol".

BACKGROUND OF THE INVENTION

The present invention relates to an improved process for the production of a biopolymer and more especially to an improved process for the preparation of a heteropolysaccharide by fermentation using methanol as the sole source of assimilable carbon.

In copending application Ser. No. 364,559, filed May 29, 1973, by Robert K. Finn et al., there is described a new class of heteropolysaccharide polymers and a novel process for the preparation of such polymers involving the culturing of a heteropolysaccharide-producing strain of a micro-organism of the genus Methylomonas on an aqueous culture medium containing methanol as the sole source of assimilable carbon. The new heteropolysaccharides were found to be useful as an especially effective drag-reducing agent in aqueous compositions, as a thickening agent for use in foods, cosmetics, paints, drilling muds, and particularly in flooding compositions utilized in the secondary recovery of underground petroleum deposits, as an emulsifier, as a flocculent or deflocculent and as a soil suspending agent. The process for the production of the heteropolysaccharide involved fermentation of a micro-organism of the genus Methylomonas on a standard "minimal salts" fermentation medium containing methanol in concentrations between about 0.5 and 5% by volume. After a fermentation time of 44 to 48 hours, this process resulted in a broth viscosity of between about 60 and 100 centipoise, and utilizing a 3% methanol concentration gave a heteropolysaccharide yield of about 5 or 6 grams per liter. It would be highly advantageous to increase the yield of heteropolysaccharide during an equivalent period of fermentation, as well as to improve the properties of the biopolymer by improving the process for its production, if possible.

SUMMARY OF THE INVENTION

It is an object of the present invention to provide an improved process for the production of heteropolysaccharides through the fermentation of a micro-organism of the genus Methylomonas on a culture medium utilizing methanol as the sole source of assimilable carbon.

It is another object of this invention to provide an improved process for the production of heteropolysaccharide wherein the yield of biopolymer is increased.

Still another object of the invention resides in the provision of an improved process for the production of heteropolysaccharide whereby the properties of the resulting biopolymer are improved.

In accomplishing the foregoing objects, there has been provided in accordance with the present invention an improved process for the preparation of a heteropolysaccharide by fermentation which cmprises culturing a heteropolysaccharide-producing strain of a micro-organism of the genus Methylomonas on a culture medium containing methanol as the sole source of assimilable carbon. The improvement comprises initiating the fermentation reaction with a methanol concentration of between about 0.5 to 2% by volume on a suitable salts medium and subsequently providing additional methanol in the range of from about 1 to 4% by volume after the aqueous fermentation broth displays an optical density of between about 1.0 and 5.0. Fermentation is carried out at a pH between about 6.0 and 7.8 and preferably within the range of 6.2 to 7.5, and at a temperature between about 25° and 33°C. A further feature of the invention comprises providing adequate levels of available iron in the medium, either as ferrous or ferric ions, to secure enhanced yields of biopolymer. The heteropolysaccharide produced by this improved process exhibits improved thickening and drag reducing properties when employed in dilute aqueous solutions.

Other objects, features and advantages of the present invention will become apparent from the following detailed description when taken together with the drawings.

DETAILED DESCRIPTION OF THE INVENTION

Figure 1:
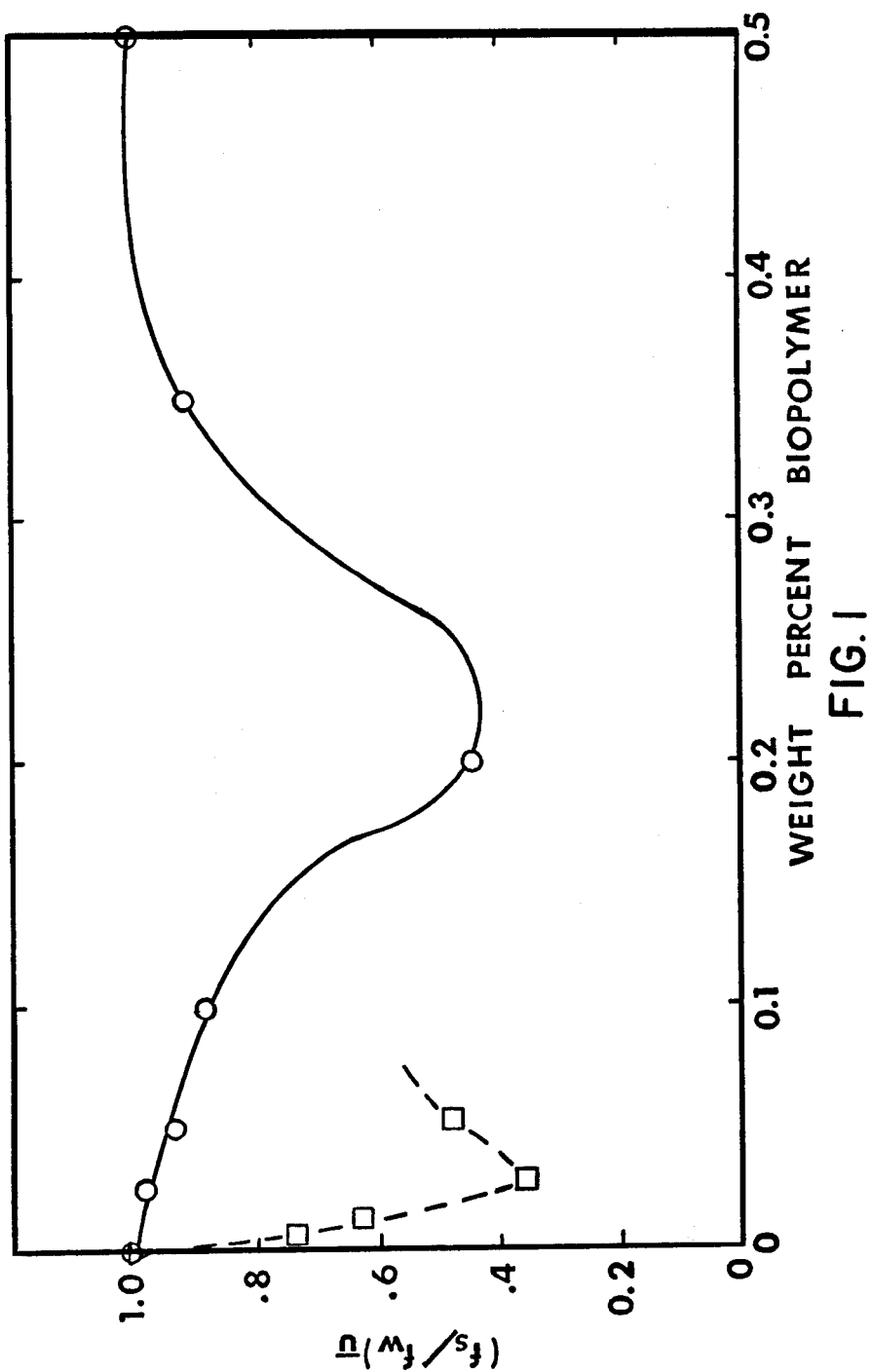
FIG. 1 is a graph showing the drag-reducing properties of the biopolymers of the invention in relation to their concentrations in aqueous solutions, with the curve defined by the squares representing the biopolymers produced in accordance with the improved process of the present invention.

The microorganisms employed in accordance with the present invention are of the type isolated by Tannahill and Finn from soil samples ("Fermentation Process Based on Methanol", Paper presented to the 160th National ACS Meeting, Chicago, Sept. 7, 1970). A specimen of this particular isolate has been deposited with the Northern Regional Research Laboratory of the U.S. Department of Agriculture in Peoria, Ill., and is identified by the number NRRL B-5696. A sample of this microorganism can be obtained from the aforementioned Research Laboratory. (The deposit was made with the understanding that all restrictions on the availability to the public being irrevocably removed upon the granting of a patent.) Its mycological characteristics are presented in detail below:

A. Morphological observations
  1. Salts-methanol (3% methanol) agar slant, 24 hours, vegitative cells, straight rods, 0.2–0.4 × 1.0–2.0 microns, singly or in pairs, motile by single polar flagellum, no spore formation, gram negative.

B. Cultural characteristics
  1. Salts-methanol (3% methanol) agar colonies — 2 days, moderate to abundant growth, circular, pulvinate, smooth, glistening, entire, mucoid, yellow, medium unchanged.
  2. Salts-methanol (3% methanol) agar streak — 2 days, moderate to abundant growth, filiform, smooth, glistening, bright yellow, butyrous to mucoid, medium unchanged.

3
3. Pigment does not diffuse into the medium.
C. Physiological characteristics
1. Relation to free oxygen: strictly aerobic, pellicle formed in broth tubes, surface growth in agar stabs.
2. Temperature: optimum growth temperature, 28°–30°C.; growth at 10°C., no growth at 35°C.
3. pH for growth: optimum pH, 6.7 to 7.2; pH limits for growth 6.0 to 7.8.
4. Catalase: positive (method of Skerman).
5. Gelatine hydrolysis: weakly positive after 24 hours (key gelatin strips).
6. Oxidase: positive (Key oxidase test tablets).
7. Pectinesterase: positive (method of McComb).
8. Nitate reductase: positive (method of Skerman).
9. Growth in presence of 1% sodium chloride, but no growth with 2% sodium chloride.
10. Utilization of other carbon sources: no growth was detected utilizing methane, formaldehyde, formamide, formate, ethanol, methylamine, glycine, DL-serine, succinate, D-glucose, fructose, glycerin or oxalate after a period of 48 hours had elapsed.
11. Litmus milk: no reaction.
12. No growth on nutrient agar, but no inhibition of growth if methanol added to the nutrient agar.
13. Absorption spectrum of the carotinoid pigment is similar to that of *Pseudomonas methanica*.
14. Yeast extracts and other vitamin mixtures do not stimulate growth.
15. Ammonium salts, nitrates, or urea serve as nitrogen sources. Other organic nitrogen sources can probably be used also.
D. Source: soil
E. Cell free extracts contained little HDP activity, but contained appreciable HPS activity according to the method of Kemp and Quayle. This suggests metabolism of methanol by the allulose pathway rather than the serine pathway.

The isolate of Tannahill and Finn exhibits certain similarities to the strain identified as *Pseudomonas methanica* by Dworkin and Foster (J. Bact., 72, 646, 1956) but it is noted that differences exist: the isolate is not as phosphate sensitive, grows within a much narrower pH range, does not grow on methane, and is more stable, i.e., does not exhibit the color variability reported for the known organism. No pink or colorless variants of the isolate have been noted.

On the basis of the foregoing, it is concluded that the microorganism of Tannahill and Finn belongs to the genus Methylomonas, which has been defined by Ribbons et al (Annual Review of Microbiology, vol. 24, pp. 135–158, 1970) as follows:
1. Obligate methylotroph;
2. motile with polar flagellation;
3. rod shaped; and
4. forming only immature cyst.

The present organism, since it does not fall within any previously described species, has been designated as *Methylomonas mucosa*.

The broth medium utilized for growth of the microorganism consists of the following:

| Material | Grams per Liter |
| --- | --- |
| KH$_2$PO$_4$ | 3.75 |
| Na$_2$HPO$_4$ | 2.50 |

4
-Continued

| Material | Grams per Liter |
| --- | --- |
| NaNO$_3$ | 2.50 |
| MgSO$_4$.7H$_2$O | 0.40 |
| Ca(NO$_3$)$_2$.4H$_2$O | 0.005 |
| FeSO$_4$.7H$_2$O | 0.005 |
| ZnSO$_4$.H$_2$O | 0.005 |

This corresponds to the minimal salts formulations, except that in the preferred embodiment a slightly higher concentration of calcium ions is employed because it has been found that an increase in calcium ions stimulates growth. As described hereinafter, it is possible to increase polymer production by supplementing the minimal salts formulation with additional amounts of iron. The level of zinc, however, is not critical and in some embodiments lower levels than that cited can be employed. Sodium nitrate represents the most preferred source of nitrogen for use in the present improved process; however, it is also possible to utilize ammonium sulfate to achieve acceptable biopolymer production. The pH value of the medium has a significant effect upon growth, with no growth taking place below a pH of 5.7 or above a pH of 8.0. Accordingly, a pH range of from about 6.0 to about 7.8 is suitable for growth of this microorganism, although a reasonable growth rate occurs only within the range of about 6.2 to about 7.5. Optimal growth takes place at a pH of approximately 7.0.

Generally, the cultivation procedure involves adding the salts to water in the above listed order, followed by pasteurization or autoclaving, if desired, since this is not essential. Methanol is then added to the salt solution at approximately room temperature. When solid media is desired to carry the organism, 1.75% BACTO AGAR may be added to the salts before pasteurization or autoclaving. Growth is carried out preferably at about 30°C. in a shaker-incubator utilizing, for example, one liter shaker flask filled with from about 200 to 400 milliliters of broth. Growth times are normally from about 48 to 96 hours, after which a highly viscous slime has been produced in the culture broth.

Similarly, recovery of the fermentation product may be accomplished in a conventional manner utilizing acetone, methanol, propanol, quaternary ammonium salts, etc. as precipitants, with acetone being preferred according to the present invention. For example, the broth culture may be first centrifuged for a period of from 10 to 20 minutes to remove some of the bacterial cells, and the clarified, slightly yellow supernatant decanted from the centrifuge to leave a cell pellet behind. To this supernatant is added from 1.2 to 2 parts by volume of acetone and the mixture is well mixed. The biopolymer, which is obtained as a lightcolored cottony precipitate, is then drained, placed into from 2 to 3 parts of fresh acetone to remove as much water as possible, and finally, is dried at room or elevated temperature to give a dry, powdery product.

In accordance with the process disclosed in Finn et al., copending application Ser. No. 364,559, from about 0.5 to 5.0% by volume of methanol was utilized in the fermentation broth and preferably between about 2 and 3% by volume. The entire amount of this methanol is added at the outset of the fermentation procedure and no additional methanol is added during the course of the fermentation process. In accordance with that process, a broth was obtained having a viscosity of approximately 60 to 100 centipoise after a fermentation time of between 44 and 48 hours, and the yield of biopolymer was approximately 5 to 6 grams per liter.

On the other hand, in accordance with the improved process of the present invention, fermentation is initiated with a lower initial concentration of methanol, generally within the range of about 0.5 to 2% volume and preferably between about 1% and 1½% by volume, and then near the end of the logarithmic phase of growth of the bacteria, an additional amount of methanol within the range of about 1 to 4% by volume is added to the fermentation system either as a single addition or serially over a period of time. The point in time at which the supplemental amount of methanol is to be added is typically about 10 to 24 hours after inoculation and corresponds to an optical density of the fermentation broth of at least about 1.0. Generally, the additional methanol may be incorporated into the broth when the optical density ranges between about 1.0 and 5.0 with beneficial result. The optical density referred to here is that measured on an appropriately diluted aliquot using a Bausch and Lomb "Spectronic 20" colorimeter in ½-inch diameter round cuvettes at 525 nanometers wavelength of light. Thereafter, the fermentation is continued, typically for another 20 to 24 hours, whereupon recovery of the polymeric product is undertaken in the manner hereinabove described. It has been found that broth viscosities in the range of 1000 to 2000 centipoises may be attained in accordance with the present improved process, and likewise, that the yield of heteropolysaccharide may be increased to at least 8 to 10 grams per liter in contradistinction to the previously employed process.

Moreover, it has been found that several of the advantageous properties exhibited by the subject heteropolysaccharides, which properties have rendered the biopolymers extremely well suited for several use applications as described in the said copending application, such as, as a drag-reducing agent in dilute aqueous solutions and as a thickener, are significantly enhanced as a result of the preparation of the biopolymer in accordance with the present improved process. Thus, drag-reduction experiments were conducted on solutions of the biopolymer utilizing the technique described by Rodriguez in Engineering Education (Natural Physical Science Vol. 230 No. 15 pp. 152–153, Apr. 12, 1974.). The parameters adopted for the apparatus were as follows: reservoir height — 4 feet, horizontal tube diameter — 0.29 centimeter, length of horizontal tube — 59 centimeters, vertical distance of effluent point to measuring point — 6 inches. The results of the testing are illustrated in FIG. 1 of the drawings in the graphical representation wherein the reduction in the friction factor of the polymeric solution is plotted as a function of the weight percent of cell free polymer at 30°C. The curve defined by the circles represents polymer prepared in accordance with the process of the aforementioned copending application, whereas the curve defined by the square points represents polymer prepared in accordance with the present invention. From this graphical representation, it may be seen that a greater degree of drag-reduction is achieved although there is utilized a significantly smaller concentration of the biopolymer produced according to the present invention.

Figure 2:
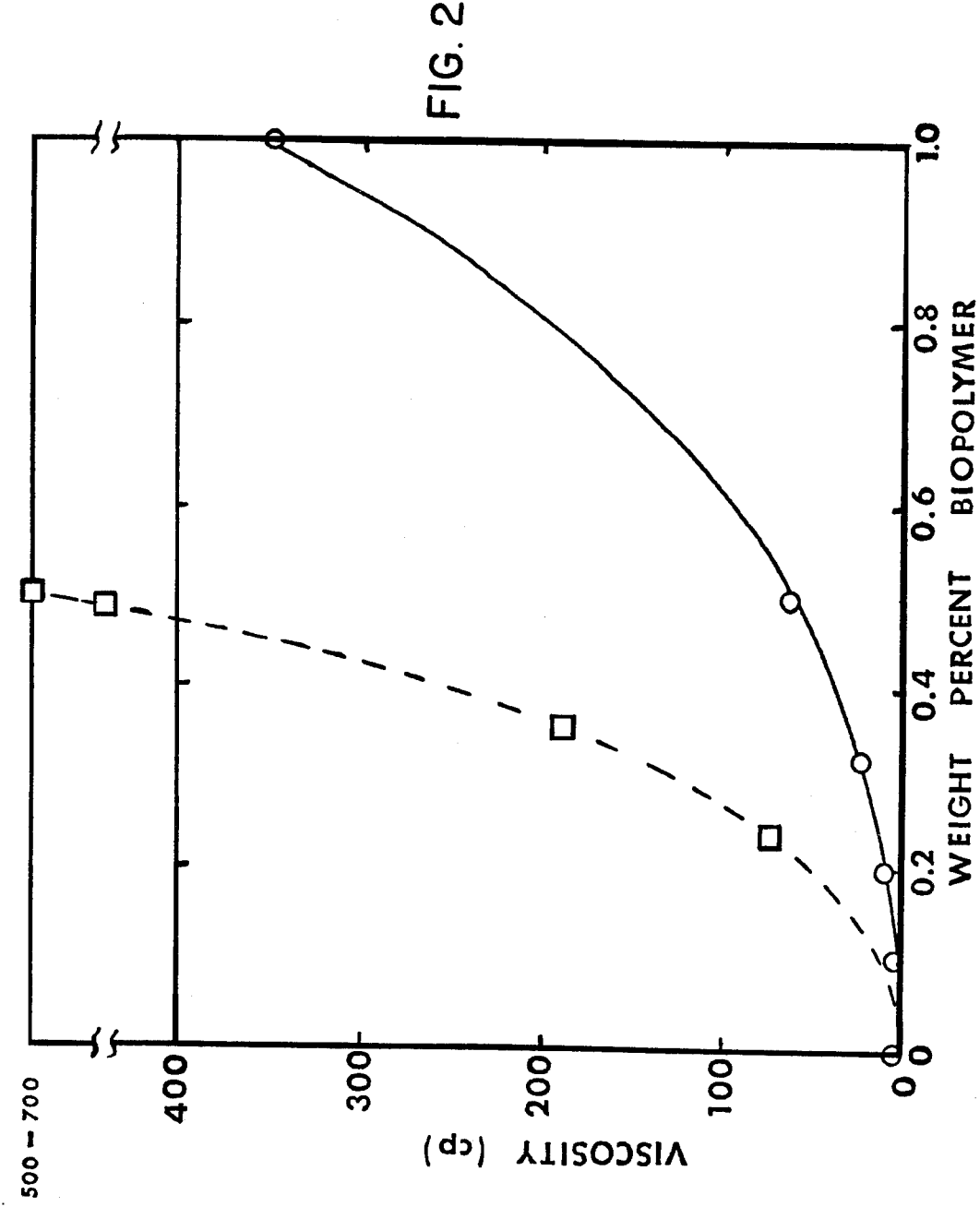
FIG. 2 is a graphical plot of viscosity correlated with the weight percent of biopolymer in aqueous solution, again with the curve defined by the squares representing the biopolymers produced in accordance with the present invention.

Similarly, in FIG. 2 is illustrated the fact that the biopolymers of the present invention exhibit properties which render them eminently more suitable as thickeners for aqueous compositions. In FIG. 2, which is a graphical correlation between viscosity (in centipoise) and weight percent of biopolymer in solution, the solid curve represents the viscosity characteristics of the biopolymers produced in accordance with the said copending application, while the broken line represents the properties of the biopolymers produced according to the process of the present invention. It is seen that the improvement in thickening ability is nearly an order of magnitude for the latter heteropolysaccharide. In addition, the increased yields achieved in accordance with the process of this invention render the instant biopolymers much more attractive and their production much more feasible from a commercial standpoint.

In another aspect of the present invention, we find that whereas the minimal salts formulation will provide sufficient iron for adequate growth of the bacteria, increased levels of iron, added in the form of inorganic salts, will often stimulate the production of biopolymer. We have found such stimulation in the range from 0.005 grams per liter to 0.500 grams per liter of $FeSO_4 \cdot 7H_2O$ or $FeSO_4 \cdot (NH_4)_2SO_4 \cdot 6H_2O$ in the range of 0.007 grams per liter to 0.700 grams per liter, the ranges of these salts are equivalent to an iron content of 1 to 100 parts per million. Alternatively, it is sometimes advantageous to incorporate into the culture medium small amounts of agents known to chelate iron, in order to enchance availability of iron for the bacteria. The availability of iron at the pH of the fermentation depends upon such factors as whether the iron is added before or after autoclaving, whether or not there is carryover eof bacterially-produced chelating agents with the inoculum, etc. Exemplary of the chelating agents that can be employed to enhance the formation of biopolymer according to the present invention are the following or their equivalents: citric acid, (ethylene dinitrilo) tetraacetic acid (EDTA), kojic acid, or 2,3 dihydroxy benzoic acid. Such chelating agents are normally used at levels corresponding to stoichiometric equivalency with the iron or at levels slightly higher than equivalency. As is well known in the art, some of these chelating agents become toxic to bacteria if added in too great an excess. The useful range for the present invention has been found to lie within 3 to 300 parts per million of chelating agent in the culture medium.

In still another aspect of the present invention, it has been found that the degree of agitation and aeration plays a role as regards the yield of biopolymer which is attained in accordance with the present fermentation process. In the first phase or stage of the batch fermentation, in which there is rapid growth of the bacteria and before addition of supplementary methanol, it seems desirable to sustain vigorous aeration and agitation. In the second or polymer-forming phase, in which growth of the bacteria is slowed down and after the addition of supplemental methanol, a high degree of aeration is neither necessary nor desirable. In a highly aerated stirred vessel, cell growth may continue at the expense of polymer formation even after the addition of supplemental methanol. On the other hand, polymer formation does require moderate aeration and agitation so that if a shake flask is filled with too much liquid broth there may be insufficient air and mixing for development of large amounts of the biopolymer.

The subdivision of the fermentation process into at least two distinguishable phases or stages, according to the present invention, affords a distinct advantage in that the fermentation is especially suited to operation as a continuous process. In the first or growth phase a higher level of aeration and agitation can be maintained than in the second or subsequent phases in which supplementary methanol is added and in which the intensity of aeration can be reduced. These several phases can be advantageously conducted in separate interconnected fermentation vats according to procedures of multi-stage fermentation already established in the art.

As indicated hereinabove, the heteropolysaccharide attained to the process of the present invention is identical in its basic make-up to the biopolymer described in the aforesaid copending application. Likewise, the biopolymer obtained according to the present process possesses all of the identical utilities as the biopolymer of the said copending application, although in several respects the biopolymer according to the present process exhibits improved properties. For example, in connection with its use as a drag-reducing agent in dilute aqueous solutions, the heteropolysaccharide produced according to the present process is advantageously employed in lower concentrations ranging from about 0.10 to about 0.5 grams per liter. Similarly, in connection with its use as a thickener in foods, cosmetics, paints and the like, drilling muds, etc., the biopolymers of the present process are typically employed in an amount ranging from about 0.005 to 1.0% by weight of a given composition. Furthermore, like the biopolymers of the copending application, those produced according to the process of this invention are particularly well suited for use in flooding compositions employed in a secondary recovery of petroleum products from subterranean cavities. Once again in this regard, lower concentrations of biopolymer may be employed in accordance with the present invention, for example, a typical flooding composition may contain between about 0.005 and about 0.5% by weight of biopolymer.

The following examples are included to more clearly illustrate the invention, it being understood that the same are intended to be merely illustrative and not in any sense limitative.

EXAMPLE 1

350 milliliters of a culture broth having the following composition are sterilized for 10 minutes at 121°C.:

| Material | Grams Per Liter |
|---|---|
| $KH_2PO_4$ | 3.75 |
| $Na_2HPO_4$ | 2.50 |
| $NaNO_3$ | 2.50 |
| $MgSO_4.7H_2O$ | 0.40 |
| $Ca(NO_3)_2.3H_2O$ | 0.025 |
| $FeSO_4.7H_2O$ | 0.005 |
| $ZnSO_4.H_2O$ | 0.005 |

The above broth was dispensed into a 1 liter indented shake flask and was mixed with 1½% by volume of methanol, inoculated with a strain Methylomonas mucosa and was cultivated with shaking at 30°C. The pH is metered constantly and appropriate amounts of KOH or $H_2SO_4$ are added to maintain the pH at 7.0. At the end of 24 hours, the optical density of the fermentation broth is 2.5, and at this point an additional 1½% by volume of methanol is added to the broth. Fermentation is conducted for an additional period of 24 hours.

At the end of the fermentation time, the broth culture is centrifuged at 20,000 g. for 15 minutes to remove some of the bacterial cells. Then acetone is added in an amount of 1.5 volumes per volume of broth supernatant obtained by decanting the clear, slightly yellow liquid from the centrifuge tube, leaving the cell pellet behind. The acetone-broth combination is mixed well, and cell-free polymer is recovered as a light-colored cottony precipitate. The polymer is drained, then placed into 2 parts of fresh acetone to remove as much water as possible, and is finally dried at room temperature for 24 hours. 9.8 grams of the crude solid polymer are obtained.

EXAMPLE 2

A salts medium of the following composition was made up:

| Material | Grams Per Liter |
|---|---|
| $KH_2PO_4$ | 3.75 |
| $Na_2HPO_4$ | 2.50 |
| $NaNO_3$ | 2.50 |
| $MgSO_4.7H_2O$ | 0.40 |
| $Ca(NO_3)_2.4H_2O$ | 0.025 |
| $ZnSO_4.H_2O$ | 0.001 |

The above medium was dispensed, in 325 mil portions, into six 1-liter indented flasks and additions were made as follows:

| Flask No. | Concentration of $FeSO_4.7H_2O$ in Grams Per Liter |
|---|---|
| 1 | .001 |
| 2 | .005 |
| 3 | .010 |
| 4 | .001 |
| 5 | .005 |
| 6 | .010 |

Flasks 4, 5 and 6 were sterilized for 20 minutes at 121°C. All flasks were brought to an initial concentration of 1% by volume of methanol, inoculated with a strain of Methylomonas mucosa and were cultivated with shaking at 30°C.

The Optical Density was measured at 24 hours and a 2% by volume methanol addition was made to all flasks.

| 24 Hour Optical Density | |
|---|---|
| Flask No. | Optical Density |
| 1 | 3.60 |
| 2 | 3.90 |
| 3 | 3.60 |
| 4 | 1.05 |
| 5 | 0.75 |
| 6 | 4.40 |

At 44 hours the Optical Densities and Viscosities of the broths were measured and the experiment terminated.

Harvest (44 hour) Results

| Flask No. | Optical Density | Viscosity (cp) |
| --- | --- | --- |
| A | 9.4 | 50 |
| 2 | 8.8 | 630 |
| 3 | 8.0 | 1440 |
| 4 | 1.5 | 1–5 |
| 5 | 0.85 | 1–5 |
| 6 | 12.0 | 560 |

EXAMPLE 3

A salts medium as described in Example 2 was made up and dispensed, in 325 mil portions, into four 1-liter indented flasks, and additions made as follows:

| Flask No. | Concentration of $FeSO_4.7H_2O$ in Grams Per Liter |
| --- | --- |
| 1 | .005 |
| 2 | .020 |
| 3 | .005+ 2,3 Dihydroxy Benzoic Acid to give a concentration of $3.5 \times 10^{-4}M$ |
| 4 | .005+Kojic Acid to give a concentration of 0.10 gm per liter |

All flasks were brought to initial concentration of 1% by volume of methanol, inoculated with a strain of *Methylomonas mucosa* and were cultivated with shaking at 30°C.

The Optical Density was measured at 19 hours and a 2% by volume methanol addition was made to all flasks.

19 Hour Optical Density

| Flask No. | Optical Density |
| --- | --- |
| 1 | 4.8 |
| 2 | 3.2 |
| 3 | 4.1 |
| 4 | 4.4 |

At 45 hours the broth Viscosities were measured and the experiment terminated.

Harvest (45 hours) Results

| Flask No. | Viscosity (cp) |
| --- | --- |
| 1 | 500 |
| 2 | 1080 |
| 3 | 960 |
| 4 | 1920 |

EXAMPLE 4

The procedure of Example 1 is repeated utilizing two separate samples of culture broth, one of 280 milliliters and the other of 400 milliliters, both contained in 1 liter indented flasks. The procedure is identical to that employed in Example 1 except that fermentation is conducted for an additional 72 hours after addition of the second amount of methanol. At the end of 96 hours, the viscosity of each broth is measured at 30 rpm on a Brookfield viscosimeter, and the results are presented below.

| Volume in shake flask (2-1. indented flasks) | 280 ml | 400 ml |
| --- | --- | --- |
| Viscosity at harvest (96 hrs) | 1210 cp | 195 cp |
| Weight of acetone-pptd. polymer | 1.69 gm | 1.19 gm |
| Viscosity of 0.5% solution | 385 cp | 20 cp |

From the foregoing it is observed that a significantly enhanced yield is obtained from the flask containing the smaller amount of culture broth and thus providing for a greater degree of aeration.

While the present invention has been described hereinabove with reference to several specific embodiments thereof, it is readily apparent that minor modifications, alterations and substitutions may be made in the process of preparing the subject heteropolysaccharide without departing from the spirit of the present invention. Therefore, it is intended that the invention be limited by only the scope of the claims appended hereto.

What is claimed is:

1. In a method of producing a heteropolysaccharide by a fermentation process of culturing a microorganism of *Methylomonas mucosa* NRRL B5696 on a culture medium containing methanol as the sole source of assimilable carbon, the improvement which comprises initiating fermentation on said culture medium with a methanol content of between about 0.5 and 2% by volume, conducting said fermentation until the optical density of the fermentation broth reaches a value of at least 1.0 and adding an additional amount of methanol within the range of about 1 to 4% by volume.

2. The method as defined by claim 1, wherein the initial methanol concentration and the subsequent addition of methanol are each in an amount of about 1.5% by volume.

3. The method as defined by claim 1, wherein the subsequent addition of methanol is undertaken while the optical density of the fermentation broth is within the range of about 1.0 to 5.0.

4. The method as defined by claim 1, wherein the culture medium is maintained at a pH between about 6.0 and 7.8 and at a temperature between about 25° and 35° C.

5. The method as defined by claim 1, wherein the improvement further comprises incorporating in the culture medium an inorganic salt of iron so as to provide an iron ion content between 1 and 10 parts per million.

6. The method as defined by claim 5, wherein the inorganic salt is ferrous sulfate.

7. The method as defined by claim 5, wherein the inorganic salt is ferrous ammonium sulfate.

8. The method as defined by claim 5, wherein the improvement further comprises incorporating in the culture medium a chelating agent for said iron ion.

9. The method as defined by claim 8, wherein the chelating agent is citric acid.

10. The method as defined by claim 8, wherein the chelating agent is 2,3 dihydroxy benzoic acid.

11. The method as defined by claim 8, wherein the chelating agent is kojic acid.

12. The method as defined by claim 8, wherein the chelating agent is (ethylene dinitrilo) tetraacetic acid (EDTA).

* * * * *